(12) United States Patent
Mulligan et al.

(10) Patent No.: US 7,597,410 B2
(45) Date of Patent: Oct. 6, 2009

(54) TRACK CHAIN JOINT WITH RADIAL SEAL UNIT

(75) Inventors: Patrick John Mulligan, Dubuque, IA (US); Matthew Banowetz, Cedar Rapids, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/690,215

(22) Filed: Mar. 23, 2007

(65) Prior Publication Data

US 2008/0231110 A1   Sep. 25, 2008

(51) Int. Cl.
*B62D 55/21*   (2006.01)
*F16J 15/34*   (2006.01)

(52) U.S. Cl. .................. 305/103; 305/104; 305/105; 305/106; 277/349; 277/551; 277/562

(58) Field of Classification Search .............. 305/100, 305/103, 104, 105, 106, 200, 202, 203, 204; 277/349, 549, 551, 562
See application file for complete search history.

(56) References Cited

U.S. PATENT DOCUMENTS

| | | | |
|---|---|---|---|
| 3,469,891 A | 9/1969 | Dell | |
| 3,492,054 A | 1/1970 | Boggs et al. | |
| 3,560,059 A | 2/1971 | Miyake | |
| 3,606,497 A | 9/1971 | Gilles | |
| 3,762,778 A | 10/1973 | Boggs et al. | |
| 3,819,242 A | 6/1974 | Robinson | |
| 3,975,028 A * | 8/1976 | Satsumabayashi et al. | 305/103 |
| 4,094,516 A * | 6/1978 | Morley et al. | 305/103 |
| 4,126,359 A | 11/1978 | Holze | |
| RE30,039 E | 6/1979 | Clemens et al. | |
| 4,199,199 A | 4/1980 | Granda | |
| 4,204,716 A | 5/1980 | Baylor | |
| 4,244,588 A | 1/1981 | Langewisch | |
| 4,251,182 A | 2/1981 | Schroeder | |
| 4,330,134 A * | 5/1982 | Kolinger | 277/363 |
| 4,423,910 A | 1/1984 | Narang | |
| 4,438,981 A | 3/1984 | Harms | |
| 4,504,066 A | 3/1985 | Horl | |
| 4,560,174 A | 12/1985 | Bisi | |
| 4,818,041 A | 4/1989 | Oertley | |
| 4,819,999 A * | 4/1989 | Livesay et al. | 305/103 |
| 4,840,438 A | 6/1989 | Cory | |

(Continued)

FOREIGN PATENT DOCUMENTS

EP   1391371 A   2/2004

(Continued)

OTHER PUBLICATIONS

Communication from the European Patent Office dated Nov. 28, 2007 (6 pages).

(Continued)

*Primary Examiner*—S. Joseph Morano
*Assistant Examiner*—Kip T Kotter

(57) ABSTRACT

An endless track chain device, comprises first and second links and a track chain joint. The track chain joint comprises a radial seal unit that inhibits ingress of debris between a bushing of the joint and the second link into a region between a pin of the joint and the bushing.

20 Claims, 8 Drawing Sheets

U.S. PATENT DOCUMENTS

| | | | |
|---|---|---|---|
| 5,183,318 A | | 2/1993 | Taft et al. |
| H1180 H | * | 5/1993 | Arianoutsos et al. ........ 277/381 |
| 5,230,589 A | | 7/1993 | Gillespie |
| 5,257,858 A | * | 11/1993 | Taft ............................ 305/204 |
| 5,259,703 A | | 11/1993 | Gillespie |
| 5,511,869 A | | 4/1996 | Edwards et al. |
| 5,763,956 A | * | 6/1998 | Metz et al. .................. 305/102 |
| 5,884,919 A | * | 3/1999 | Saito .......................... 277/562 |
| 6,074,022 A | | 6/2000 | Anderton et al. |
| 6,092,809 A | | 7/2000 | Keifer et al. |
| 6,102,408 A | * | 8/2000 | Anderton et al. ............. 277/370 |
| 6,145,941 A | | 11/2000 | Anderton et al. |
| 6,176,491 B1 | | 1/2001 | Bertoni |
| 6,206,491 B1 | | 3/2001 | Hisamatsu |
| 6,371,577 B1 | | 4/2002 | Hasselbusch et al. |
| 6,382,742 B1 | | 5/2002 | Hasselbusch et al. |
| 6,454,366 B1 | | 9/2002 | Egle |
| 6,656,293 B2 | | 12/2003 | Black et al. |
| 6,739,680 B2 | | 5/2004 | Hasselbusch et al. |
| 6,783,129 B2 | | 8/2004 | Akita et al. |
| 6,869,244 B2 | | 3/2005 | Anderton et al. |
| 7,240,973 B2 | * | 7/2007 | Takayama ................... 305/117 |
| 7,347,513 B2 | | 3/2008 | Johannsen et al. |
| 2003/0219181 A1 | | 11/2003 | Yamamoto et al. |
| 2004/0114993 A1 | | 6/2004 | Anderton et al. |
| 2004/0228676 A1 | | 11/2004 | Oertley |
| 2006/0251349 A1 | | 11/2006 | Schmeling et al. |
| 2006/0290067 A1 | * | 12/2006 | Dahlheimer ................. 277/345 |
| 2007/0267821 A1 | * | 11/2007 | Vom Stein et al. .......... 277/500 |

FOREIGN PATENT DOCUMENTS

| | | |
|---|---|---|
| WO | 8100545 A | 3/1981 |
| WO | 8908577 | 9/1989 |

OTHER PUBLICATIONS

Case Extended Life Track Information (1 page) (prior art).
Cat® SystemOne™ Undercarriage Information (7 pages) (prior art).
Deere J Dozers Brochure (24 pages) (prior art).
Drawings Of Prior Art Systems (2 pages) (prior art).
Statement About Track Chain Joints (3 pages) (prior art).
Track Joint Seal Of Deere 850J Crawler (1 page) (prior art).
U.S. Appl. No. 11/525,367, filed Sep. 22, 2006.

* cited by examiner

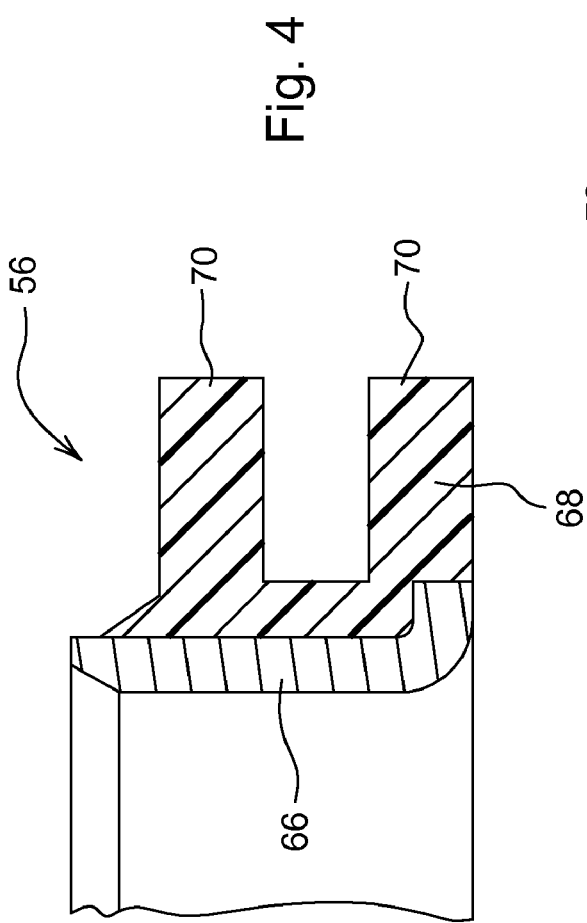
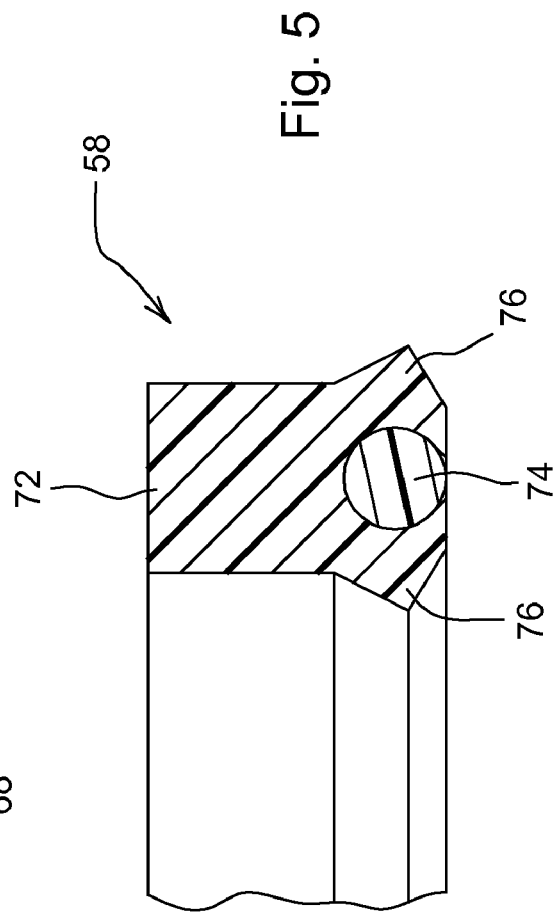

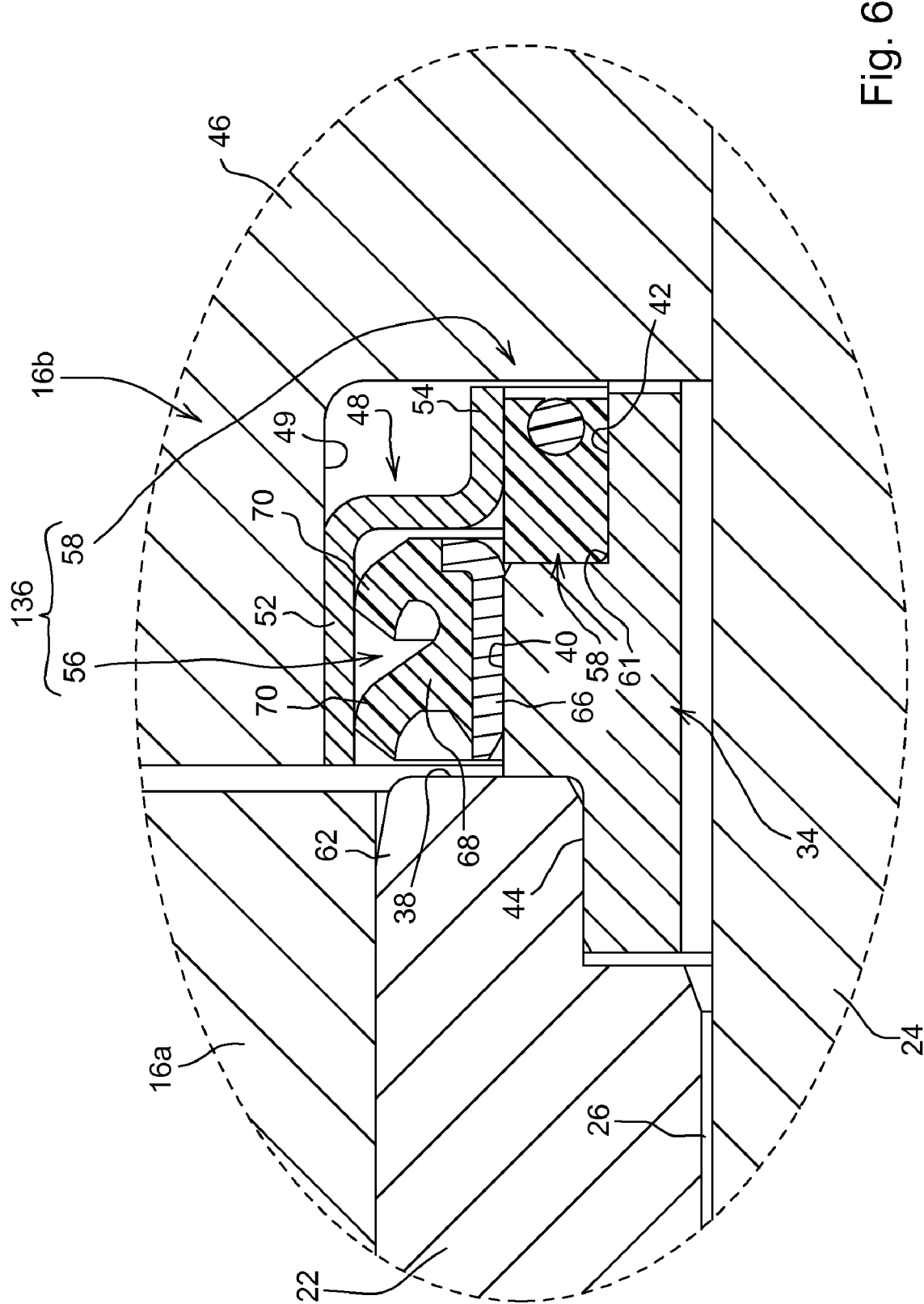

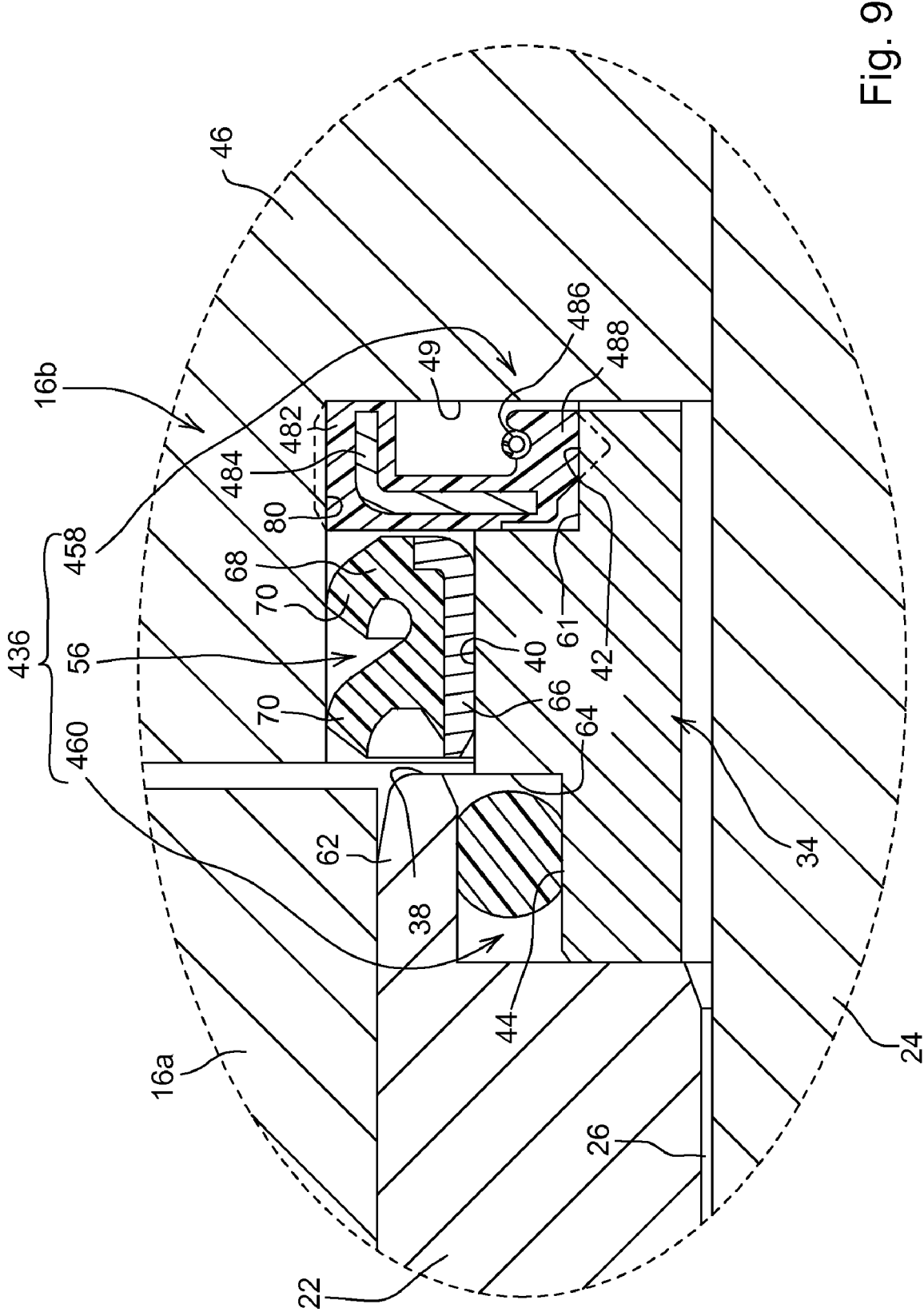

TRACK CHAIN JOINT WITH RADIAL SEAL UNIT

FIELD OF THE DISCLOSURE

The present disclosure relates to a track chain joint for an endless track chain of a tracked vehicle.

BACKGROUND OF THE DISCLOSURE

An endless track chain includes joints between adjacent links for relative rotation between the links as the track chain advances through its closed-loop path. Each joint is lubricated with a lubricant such as oil in a region between the pin and bushing of the joint. One or more seals inhibit ingress of debris into that region, which could otherwise degrade the effectiveness of the joint and, thus, the track chain itself.

Such a seal is often configured as a face seal, loaded onto an end face of the bushing during assembly. However, over time, both the seal and the end face can become worn as well as other components of the track chain, which may result in axial end play, compromising the integrity of the sealing interface between the seal and end face as well as the integrity of the lubricant intended to be protected by the seal.

SUMMARY OF THE DISCLOSURE

According to the present disclosure, there is provided an endless track chain device for an endless track chain of a tracked vehicle. The device comprises first and second links and a track chain joint. The track chain joint comprises a bushing to which the first link is fixed, a pin received in the bushing and to which the second link is fixed such that the pin and the bushing are rotatable relative to one another for corresponding relative rotation between the first and second links, an annular spacer spacing the bushing and the second link axially apart from one another, and an annular radial seal unit.

The radial seal unit inhibits ingress of debris between an end face of the bushing and the second link into a region between the pin and the bushing. The radial seal unit is spaced axially apart from the end face and acts radially sealingly against the spacer and the second link. Use of such a radial seal unit accommodates for some axial endplay that may result between the bushing end face and the second link upon wear of components in the track chain.

The above and other features will become apparent from the following description and the attached drawings.

BRIEF DESCRIPTION OF THE DRAWINGS

The detailed description of the drawings refers to the accompanying figures in which:

FIG. 4 is a sectional view of a first radial seal for use in the radial seal unit;

FIG. 5 is a sectional view of a second radial seal for use in the radial seal unit;

FIG. 6 is a sectional view showing an alternative radial seal unit;

FIG. 9 is a sectional view showing still another alternative radial seal unit.

DETAILED DESCRIPTION OF THE DRAWINGS

Figure 1:
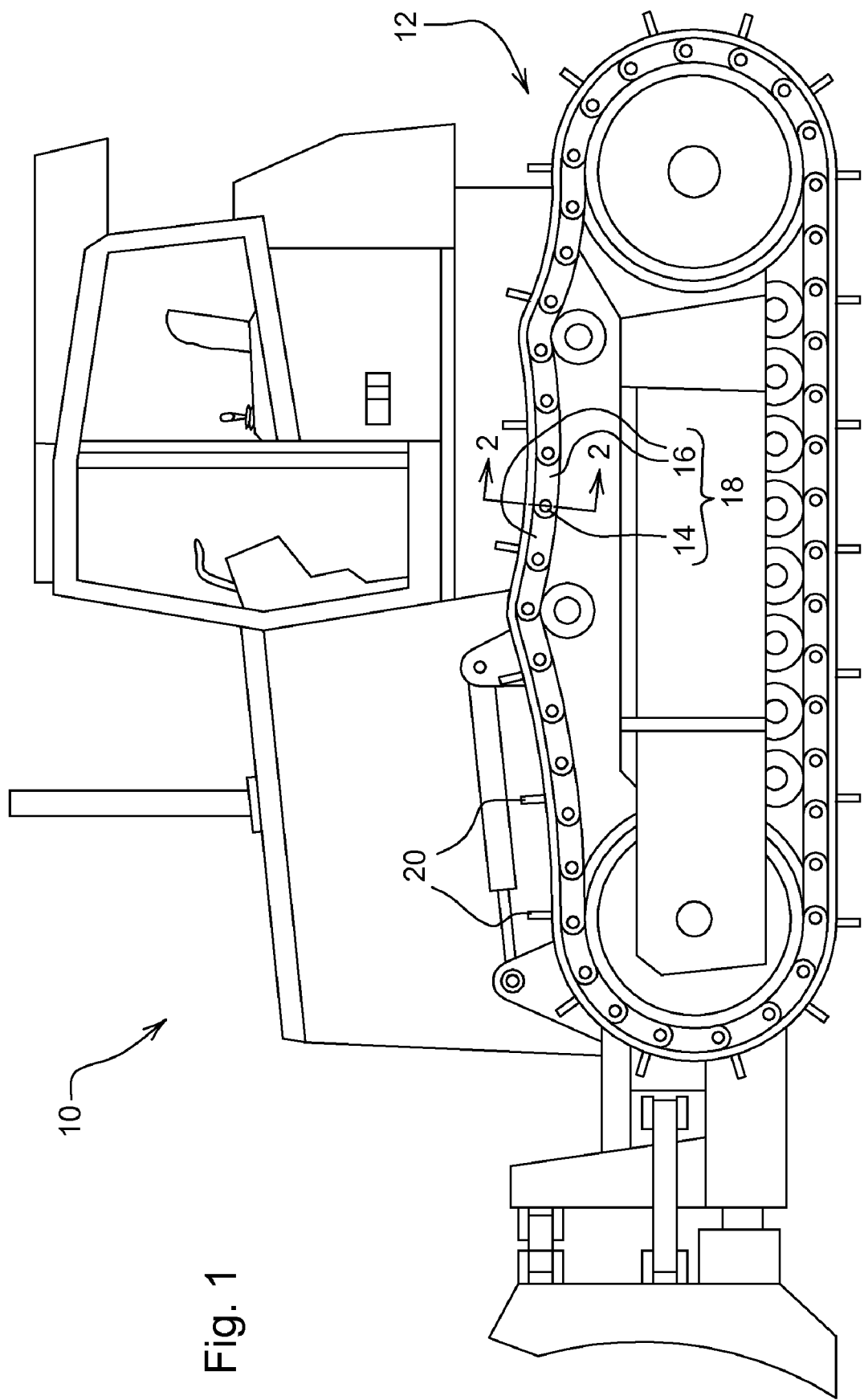
FIG. 1 is a side elevation view of a tracked vehicle that has an endless track chain.

Referring to FIG. 1, there is shown an exemplary tracked vehicle 10 having an endless track chain 12 for use in propulsion of the vehicle 10. The vehicle 10 may be any type of tracked vehicle, the illustrated dozer being just one of many different types of tracked vehicles well known in the art of tracked vehicles. Further, the vehicle 10 may have, and typically does have, an endless track chain 12 on both sides of the vehicle, one such side being shown in FIG. 1.

The track chain 12 has a plurality of track chain joints 14 extending in transverse relation to the longitudinal extent of the track chain 12. Each joint 14 interconnects a number of longitudinally-extending links 16 for relative rotation therebetween about an axis 17 of the joint 14 as the track chain 12 advances through its closed-loop path. A plurality of ground-engaging shoes 20 are mounted to the links 16 for engagement with the ground. Each joint 14 and the links 16 interconnected thereby provide what may be referred to as an endless track chain device 18.

Figure 2:
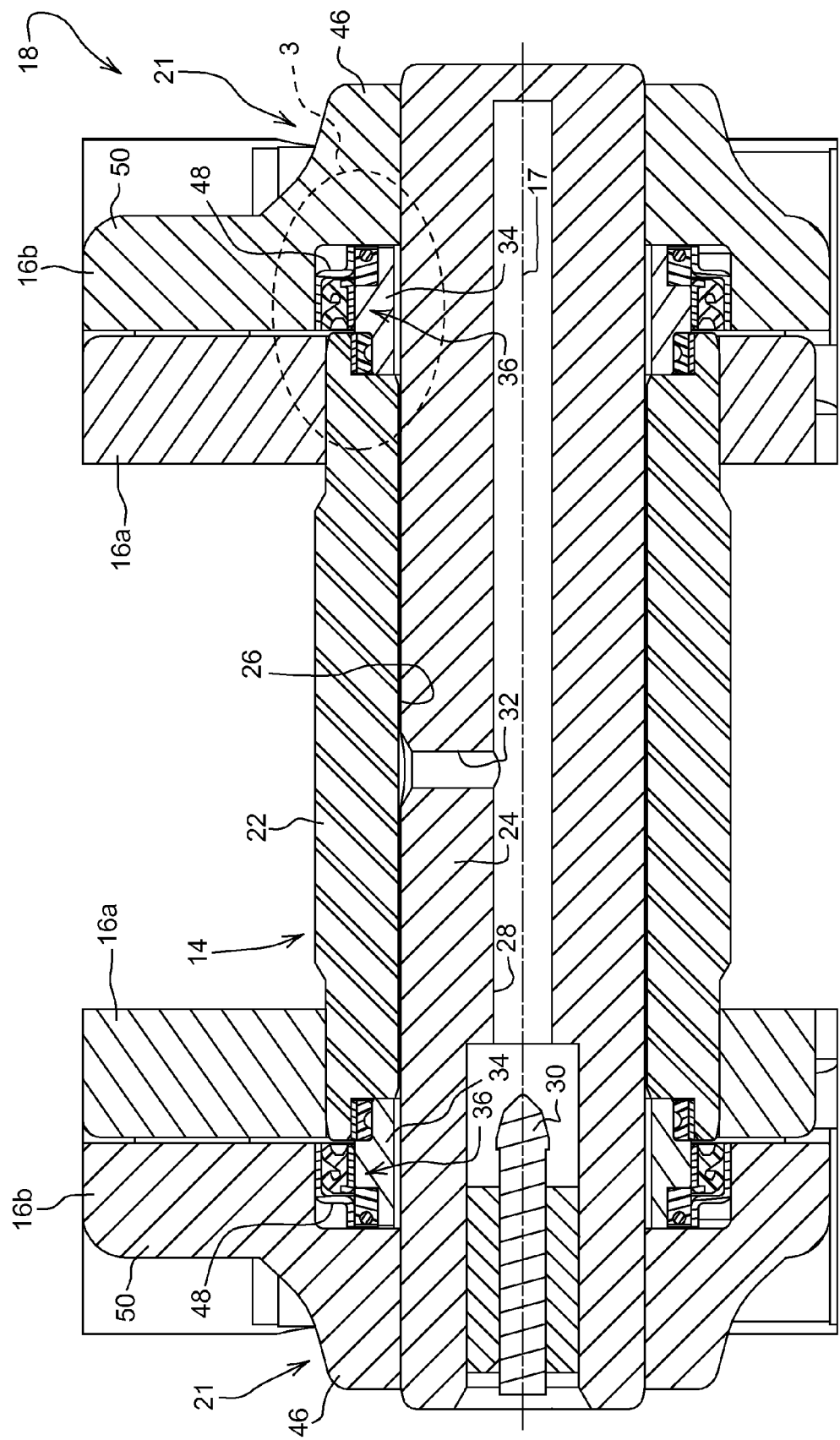
FIG. 2 is a sectional view taken along lines 2-2 of FIG. 1 of a device of the track chain.

Referring to FIG. 2, there is shown in cross-section an example of such an endless track chain device 18 with its joint 14 and links 16. The links 16 may be identified more particularly as two first links 16a and two second links 16b. The joint 14 has opposite axial end portions 21. A first link 16a and a second link 16b are located at each axial end portion 21.

The track chain joint 14 has a bushing 22 and a pin 24. The first links 16a are fixed to the bushing, and the second links 16b are fixed to the pin 24. The pin 24 is received in the bushing 22 such that the pin 24 and the bushing 22 are rotatable relative to one another for corresponding relative rotation between the first and second links 16a, 16b at each end portion 21. There is a small clearance or region 26 between the bushing 22 and pin 24. This region 26 is lubricated by a lubricant such as oil which may be introduced into a lubricant cavity 28 of the pin upon removal of a plug 30 at an end of the pin 24. Lubricant is communicated from the cavity 28 to the region 26 via a channel 32.

At each end portion 21, the joint 14 further has an annular spacer 34 and a radial seal unit 36. Since the end portions 21 are similar to one another, the following description of the spacer 34 and radial seal unit 36 at the right end portion 21 ("right" as viewed in FIG. 2) applies also to the corresponding components at the left end portion 21.

Figure 3:
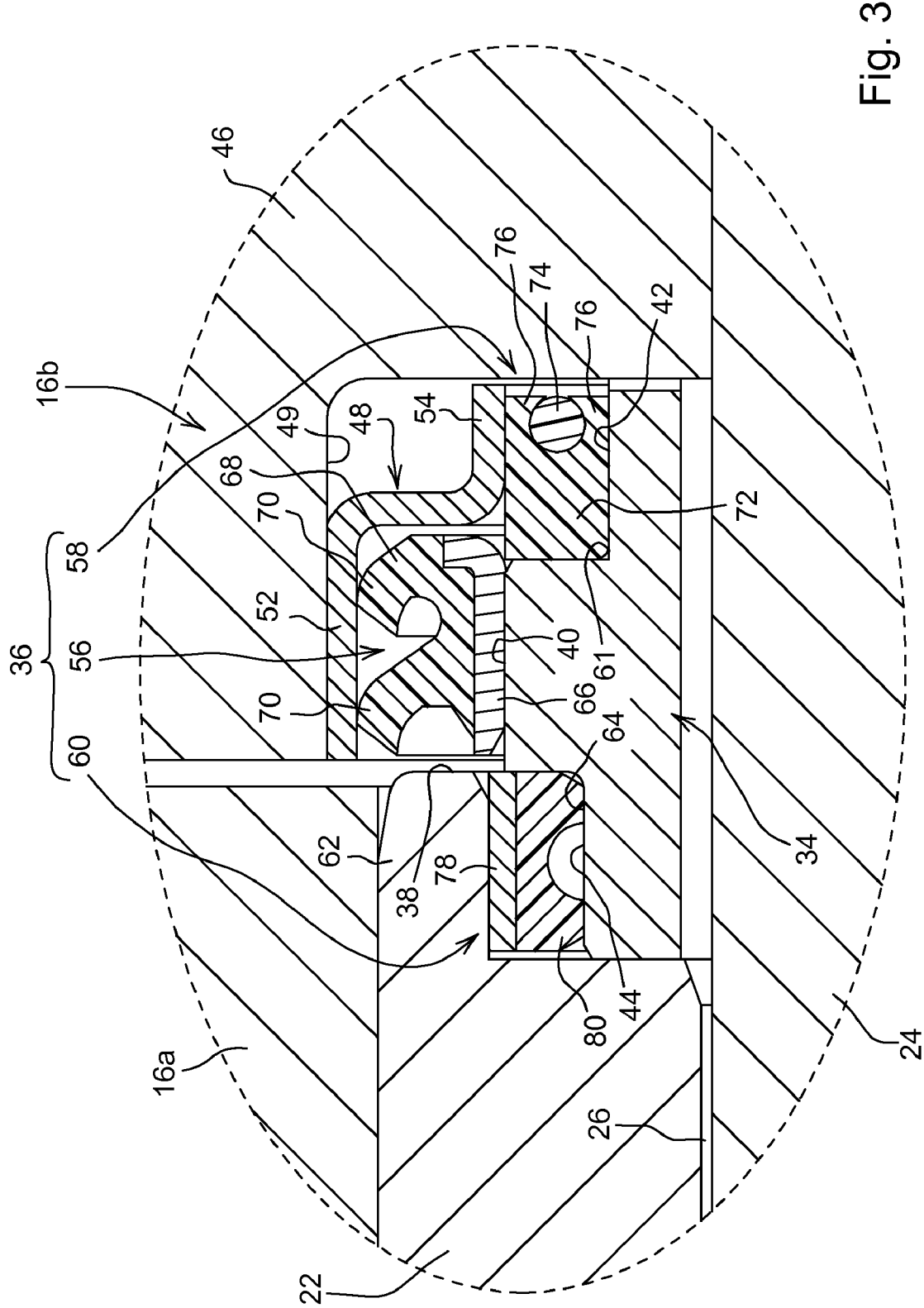
FIG. 3 is an enlarged sectional view of a region 3 of FIG. 2 showing a first embodiment of a radial seal unit.

Referring to FIG. 3, the spacer 34 and the radial seal unit 36 are shown enlarged to facilitate their description. The spacer 34 spaces the bushing 22 and the second link 16b axially apart from one another. The radial seal unit 36 inhibits ingress of debris between an end face 38 of the bushing 22 and the second link 16b into the region 26 between the pin 24 and the bushing 22. The radial seal unit 36 is spaced axially apart from the end face 38 and acts radially sealingly against the spacer 34 and the second link 16b.

The spacer 34 has a middle first spacer step 40, an axially outer second spacer step 42, and an axially inner third spacer step 44. These spacer steps are formed in the outer surface of the spacer, and provide contact points for seals of the seal unit 36 as discussed below. The first spacer step 40 is positioned axially between second and third spacer steps 42, 44. Each of the second and third spacer steps 42, 44 is radially inward from the first spacer step 40. The spacer 34 is configured, for example, as a thrust ring.

The second link 16b, in this example, has a collar 46 surrounding the pin 24 and a ring 48 fitted into a cavity 49 of the collar 46 so as to be fixed thereto. Illustratively, the collar 46 is one-piece with an arm 50 (FIG. 2) of the link 16 extending between adjacent joints 14. In other examples, the collar 46 may be distinct from the arm 50, but nonetheless fixed thereto. The ring 48 has a first ring step 52 and a second ring step 54 radially inward from the first ring step 52.

The radial seal unit 36 has an annular first radial seal 56, an annular second radial seal 58, and an annular third radial 60. The first radial seal 56 is sandwiched between and in sealing contact with the first spacer step 40 and the first ring step 52. The second radial seal 58 is sandwiched between and in sealing contact with the second spacer step 42 and the second ring step 54. The second radial seal 58 is positioned in a recess 61 defined between the first and second spacer steps 40, 42. The third radial seal 60 is sandwiched between and in sealing contact with a radially inner surface of a rim 62 of the bushing 22. The third radial seal 60 is positioned in a recess 64 defined between the first and third spacer steps 40, 44.

The radial seal unit 36 is included in a labyrinth between the spacer 34 and the second link 16b. The path defined between the spacer steps 40, 42 and the ring steps 52, 54 provides the labyrinth. As such, the first and second seals 56, 58 are positioned in this labyrinth.

Referring to FIGS. 3 and 4, the first radial seal 56 exemplarily has a mounting ring 66 positioned on the first spacer step 40 and an elastomeric member 68 mounted on the mounting ring 66. The elastomeric member 68 has axially-spaced annular lips 70 extending radially outwardly relative to the mounting ring 66.

Referring to FIGS. 3 and 5, the second radial seal 58 exemplarily has a first elastomeric member 72 and a second elastomeric member 74. The second elastomeric member 74 is embedded in the first elastomeric member 72 between annular radially outer and inner fingers 76 thereof. The second elastomeric member 74 is, for example, an O-ring. The second radial seal 58 is, thus, configured as an energized U-cup.

Referring to FIG. 3, the third radial seal 60 exemplarily has a mounting ring 78 and an elastomeric member 80. The third radial seal 60 accounts for variations within the manufacturing tolerances of the bushing 22 and spacer 34.

Referring to FIG. 6, there is shown an alternative radial seal unit 136 for use in the joint 14. The radial seal unit 136 is similar to the radial seal unit 36 in that it has both of the first and second radial seals 56, 58. However, it is different in that it omits the third radial seal 60. Instead, the rim 62 of the bushing 22 is slightly thicker such that the third spacer step 44 is press-fitted into the bushing 22 within the thickened rim 62, forming a sealed connection therebetween.

Figure 7:
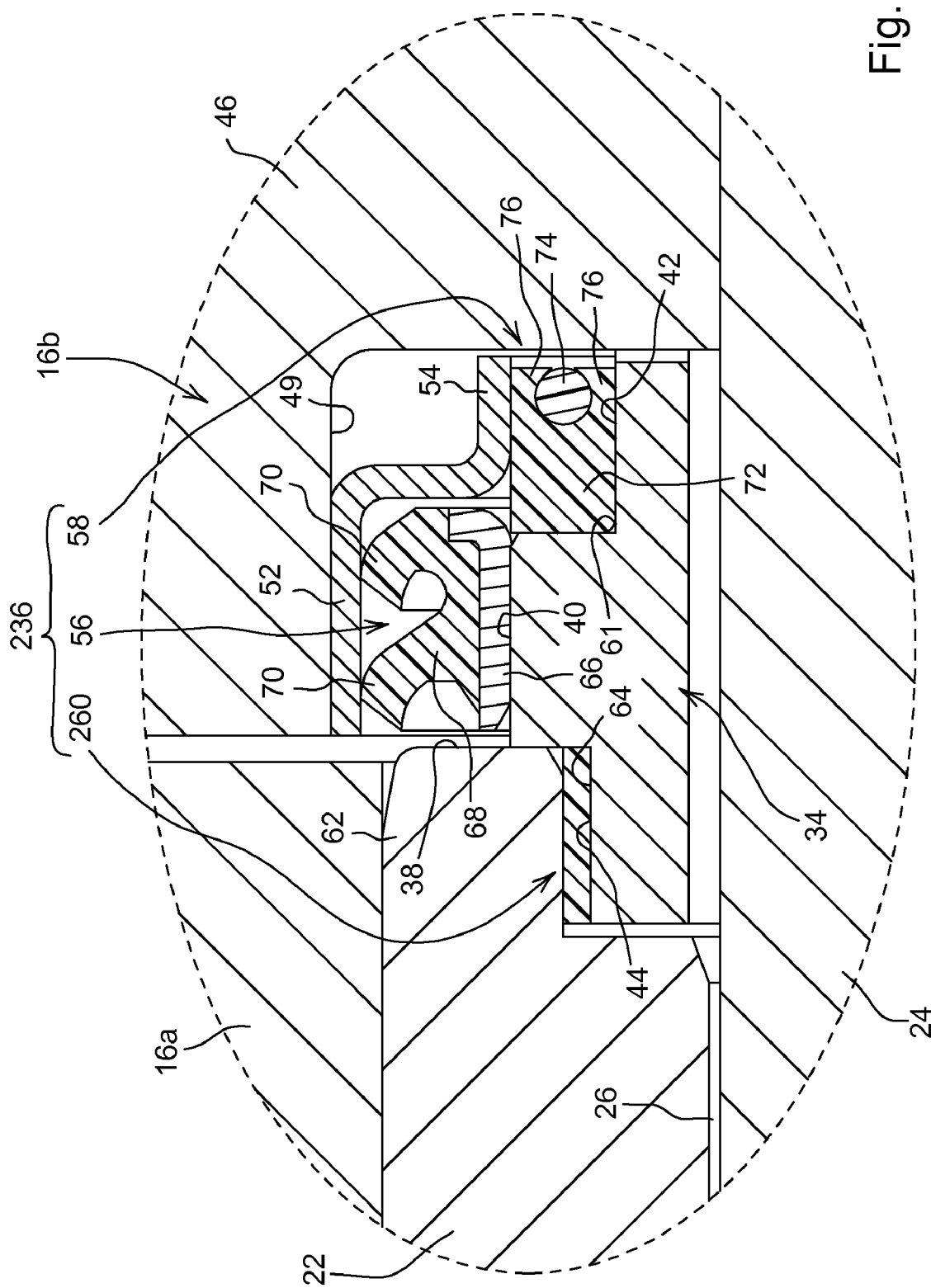
FIG. 7 is a sectional view showing another alternative radial seal unit.

Referring to FIG. 7, there is shown another alternative radial seal unit 236 for use in the joint 14. The radial seal unit 236 is similar to the radial seal unit 36 in that it has both of the first and second radial seals 56, 58. However, in place of the third radial seal 60, it has a thinner annular third radial seal 260 which is an elastomeric member sandwiched between and in sealing contact with the third spacer step 44 and the rim 62 (which is slightly thicker than in the embodiment of FIG. 3). The third radial seal 260 accounts for variations within the manufacturing tolerances of the bushing 22 and spacer 34.

Figure 8:
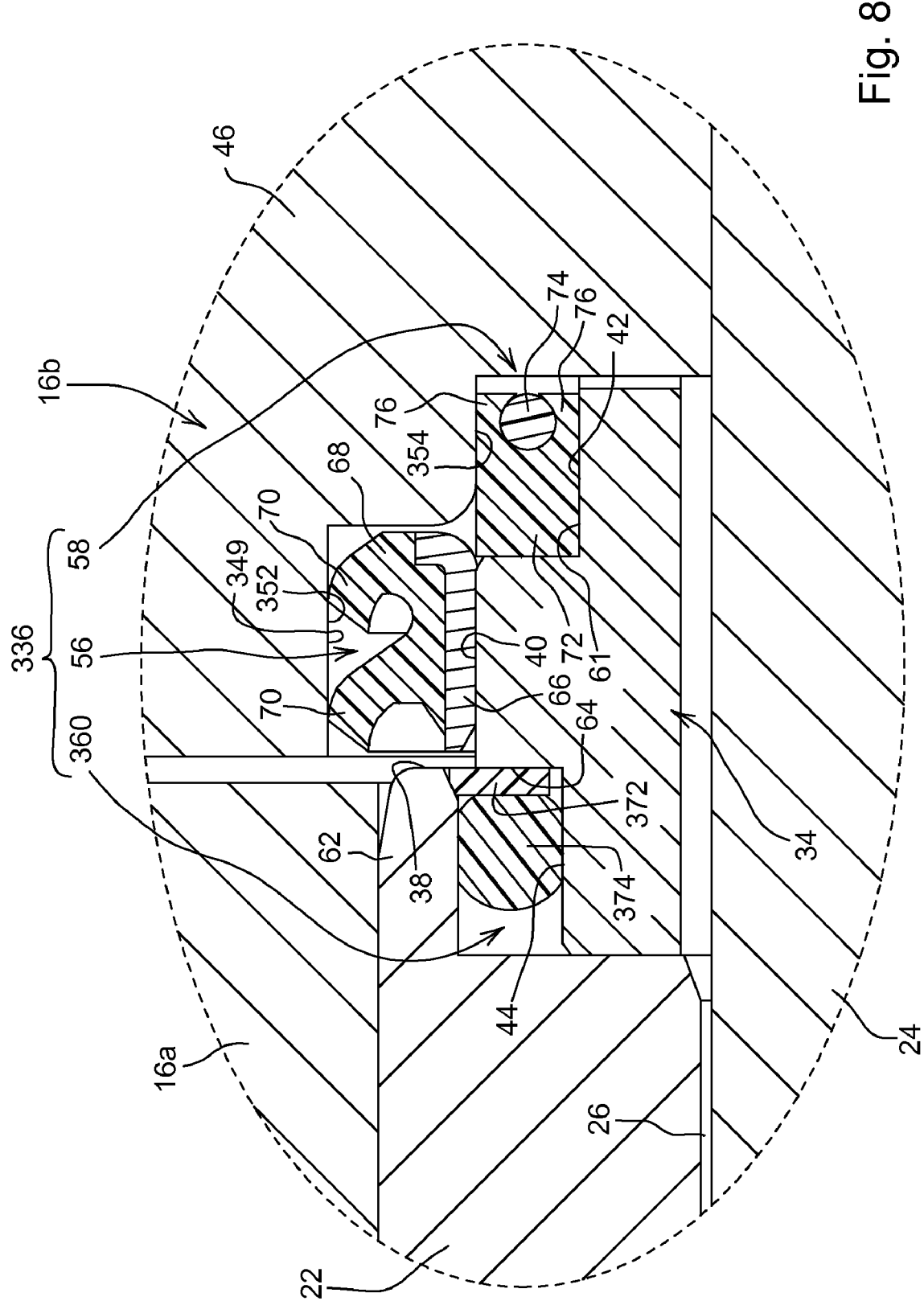
FIG. 8 is a sectional view showing yet another alternative radial seal unit.

Referring to FIG. 8, there is shown yet another alternative radial seal unit 336 for use in the joint 14. The radial seal unit 336 is similar to the radial seal unit 36 in that it has both of the first and second radial seals 56, 58. However, in place of the third radial seal 60, it has an annular third radial seal 360 which has a first elastomeric member 372 and a second elastomeric member 374 (e.g., O-ring). The second elastomeric member 374 is positioned in the recess 64 and sandwiched between and in sealing contact with the rim 62 and the third step 44. The first elastomeric member 372 acts as a back-up ring (stated otherwise, a retainer ring) to ensure that the second elastomeric member 374 is lodged completely between the rim 62 and the third step 44 so that the second elastomeric member 374 does not pop out with the spacer 34 upon assembly. The radial seal 360 accounts for variations within the manufacturing tolerances of the bushing 22 and spacer 34.

Further, in the embodiment of FIG. 8, the ring 48 is omitted. Instead, the cavity 348 of the collar 46 is formed with a first collar step 352 and a second collar step 354 radially inward from the collar step 352. The first radial seal 56 is sandwiched between and in sealing contact with the first spacer step 40 and the first collar step 352. The second radial seal 58 is sandwiched between and in sealing contact with the second spacer step 42 and the second collar step 354.

Referring to FIG. 9, there is shown still another alternative radial seal unit 436 for use in the joint 14. The radial seal unit 436 is similar to the radial seal unit 36 in that it has the first radial seal 56. However, in place of the second radial seal, it has an annular second radial seal 458, and, in place of the third radial seal, it has an annular third radial seal 460.

The first and second radial seals 56, 458 are positioned in the cavity 49 formed in the collar 46 of the link 16b. The first radial seal 56 is sandwiched between and in sealing contact with the first spacer step 40 and a radially inwardly-facing wall 80 of the collar 46. The mounting ring 66 is positioned on the first spacer step 40 and the lips 70 extend radially outwardly relative to the mounting ring 66 into sealing contact with the wall 80. The second radial seal 458 is positioned in the recess 61 and is sandwiched between and in sealing contact with the second spacer step 42 and the wall 80 (the phantom lines of the seal 458 represent its shape when relaxed).

The second radial seal 458 has an annular seal body 482, an annular reinforcement member 484, and an annular spring 486. The seal body 482 has a generally U-shaped cross-section and is made of an elastomeric material. It is loaded in compression when installed. The reinforcement member 484 is embedded in the seal body 482, has a generally L-shaped cross-section, and is made of metal. The spring 486 is configured as a coil spring pressing against a radially inner arm 488 of the seal body 482 further urging the arm 488 radially inwardly in sealing contact with the second spacer step 42.

The third radial seal 460 is configured, for example, as an O-ring. Further, it is positioned in the recess 64 and sandwiched between and in sealing contact with the rim 62 and the third step 44. The third radial seal 460 accounts for variation within the manufacturing tolerances of the bushing 22 and spacer 34.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An endless track chain device, comprising:
first and second links, and
a track chain joint comprising:
a bushing to which the first link is fixed,
a pin received in the bushing and to which the second link is fixed such that the pin and the bushing are rotatable relative to one another for corresponding relative rotation between the first and second links,
an annular spacer spacing the bushing and the second link axially apart from one another, and
an annular radial seal unit that inhibits ingress of debris between an end face of the bushing and the second link into a region between the pin and the bushing, the radial seal unit spaced axially apart from the end face and acting radially inwardly sealingly against the spacer therearound and radially outwardly sealingly against the second link, the bushing comprises axially opposite first and second end portions, the end face is one of multiple axially-facing surfaces of the first end portion facing in the same axial direction, and the radial seal unit is spaced axially apart from all the axially-facing surfaces of the first end portion.

2. The endless track chain device of claim 1, wherein the radial seal unit comprises an annular first radial seal and an annular second radial seal.

3. The endless track chain device of claim 2, wherein the first radial seal comprises a mounting ring and an elastomeric member mounted on the mounting ring, the elastomeric member of the first radial seal comprises axially-spaced annular lips extending radially outwardly relative to the mounting ring, the second radial seal comprises a first elastomeric member and a second elastomeric member embedded in the first elastomeric member of the second radial seal between annular radially outer and inner fingers of the first elastomeric member of the second radial seal.

4. The endless track chain device of claim 2, wherein the radial seal unit comprises an annular third radial seal.

5. The endless track chain device of claim 2, wherein the first and second radial seals are included in a labyrinth between the spacer and the second link.

6. The endless track chain device of claim 1, wherein the radial seal unit is included in a labyrinth between the spacer and the second link.

7. The endless track chain device of claim 1, wherein the radial seal unit comprises an annular radial seal, and the radial seal comprises a mounting ring and an elastomeric member mounted on the mounting ring, and the elastomeric member comprises axially-spaced annular lips extending radially outwardly relative to the mounting ring.

8. The endless track chain device of claim 1, wherein the radial seal unit comprises an annular radial seal, and the radial seal comprises a first elastomeric member and a second elastomeric member embedded in the first elastomeric member between annular radially outer and inner fingers thereof.

9. The endless track chain device of claim 1, wherein the radial seal unit comprises an annular radial seal, and the radial seal comprises a seal body sealingly contacting the spacer and a radially inwardly-facing wall of a collar of the second link, a reinforcement member embedded in the seal body, and a spring urging a portion of the seal body against the spacer.

10. An endless track chain comprising the endless track chain device of claim 1.

11. An endless track chain device, comprising:
first and second links, and
a track chain joint comprising:
a bushing to which the first link is fixed,
a pin received in the bushing and to which the second link is fixed such that the pin and the bushing are rotatable relative to one another for corresponding relative rotation between the first and second links,
an annular spacer spacing the bushing and the second link axially apart from one another, and
an annular radial seal unit that inhibits ingress of debris between an end face of the bushing and the second link into a region between the pin and the bushing, the radial seal unit spaced axially apart from the end face and acting radially inwardly sealingly against the spacer therearound and radially outwardly sealingly against the second link, wherein the radial seal unit comprises an annular first radial seal and an annular second radial seal, the spacer comprises a first spacer step and a second spacer step radially inward from the first spacer step, the first radial seal sealingly contacts the first spacer step, and the second radial seal sealingly contacts the second spacer step and is positioned in a recess defined radially and axially between the first and second spacer steps.

12. The endless track chain device of claim 11, wherein the second link comprises a collar and a ring fitted into the collar, the ring comprises a first ring step and a second ring step radially inward from the first ring step, the first radial seal sealingly contacts the first ring step, and the second radial seal sealingly contacts the second ring step.

13. The endless track chain device of claim 11, wherein the second link comprises a collar, the collar comprises a first collar step and a second collar step radially inward from the first collar step, the first radial seal sealingly contacts the first collar step, and the second radial seal sealingly contacts the second collar step.

14. The endless track chain device of claim 11, wherein the spacer comprises a third spacer step radially inward from the first spacer step, the first spacer step is positioned axially between the second and third spacer steps, and the radial seal unit comprises an annular third radial seal contacting the bushing and the third spacer step and positioned in a recess defined between the first and third spacer steps.

15. The endless track chain device of claim 14, wherein the third radial seal comprises an elastomeric member.

16. The endless track chain device of claim 11, wherein the first radial seal comprises a mounting ring positioned on the first spacer step and an elastomeric member mounted on the mounting ring, the elastomeric member of the first radial seal comprises axially-spaced annular lips extending radially outwardly relative to the mounting ring into sealing contact with a radially inwardly-facing wall of a collar of the second link, and the second radial seal unit comprises a seal body sealingly contacting the second spacer step and the radially inwardly-facing wall, a reinforcement member embedded in the seal body, and a spring urging a portion of the seal body against the second spacer step.

17. An endless track chain device, comprising:
first and second links, and
a track chain joint comprising:
a bushing to which the first link is fixed,
a pin received in the bushing and to which the second link is fixed such that the pin and the bushing are rotatable relative to one another for corresponding relative rotation between the first and second links,
an annular spacer spacing the bushing and the second link axially apart from one another, and
an annular radial seal unit that inhibits ingress of debris between an end face of the bushing and the second link into a region between the pin and the bushing, the radial seal unit spaced axially apart from the end face and acting radially inwardly sealingly against the spacer and radially outwardly sealingly against the second link to establish a sealed radial connection therebetween and acting radially inwardly sealingly against the spacer and radially outwardly sealingly against the bushing to establish a sealed radial connection therebetween, wherein the radial seal unit comprises an annular first radial seal and an annular second radial seal, the first radial seal contacts the spacer and the second link, the second radial seal contacts the spacer and the bushing, the second radial seal contacts a radially inwardly-facing surface of the bushing and is positioned in axial spaced-apart relation from an axially-facing surface of the bushing, recessed axially only one step from the end face, in a cavity defined in the bushing between the axially-facing surface and the radially inwardly-facing surface.

18. The endless track chain device of claim 17, wherein the radial seal unit comprises an annular third radial seal acting radially inwardly sealingly against the spacer and radially outwardly sealing against the second link to establish a sealed radial connection therebetween, the spacer comprises a first spacer step on which the first radial seal is positioned, a second spacer step on which the second radial seal is positioned, and a third spacer step on which the third radial seal is positioned.

19. The endless track chain device of claim 18, wherein the first spacer step is positioned axially between and radially outward from the second spacer step and the third spacer step.

20. The endless track chain device of claim 17, wherein the end face and the axially-facing surface face in the same axial direction as one another, the axially-facing surface is recessed axially from the end face, the radially inwardly-facing surface extends axially between the end face and the axially-facing surface so as to interconnect the end face and the axially-facing surface, and the spacer contacts the axially-facing surface.

* * * * *